March 30, 1965 R. C. FISCHER 3,175,769
SELF-PROPELLED IRRIGATION APPARATUS
Filed Sept. 14, 1961 4 Sheets-Sheet 1

Inventor:
Raymond C. Fischer
Paul O. Pippel Atty.

March 30, 1965    R. C. FISCHER    3,175,769
SELF-PROPELLED IRRIGATION APPARATUS
Filed Sept. 14, 1961    4 Sheets-Sheet 2
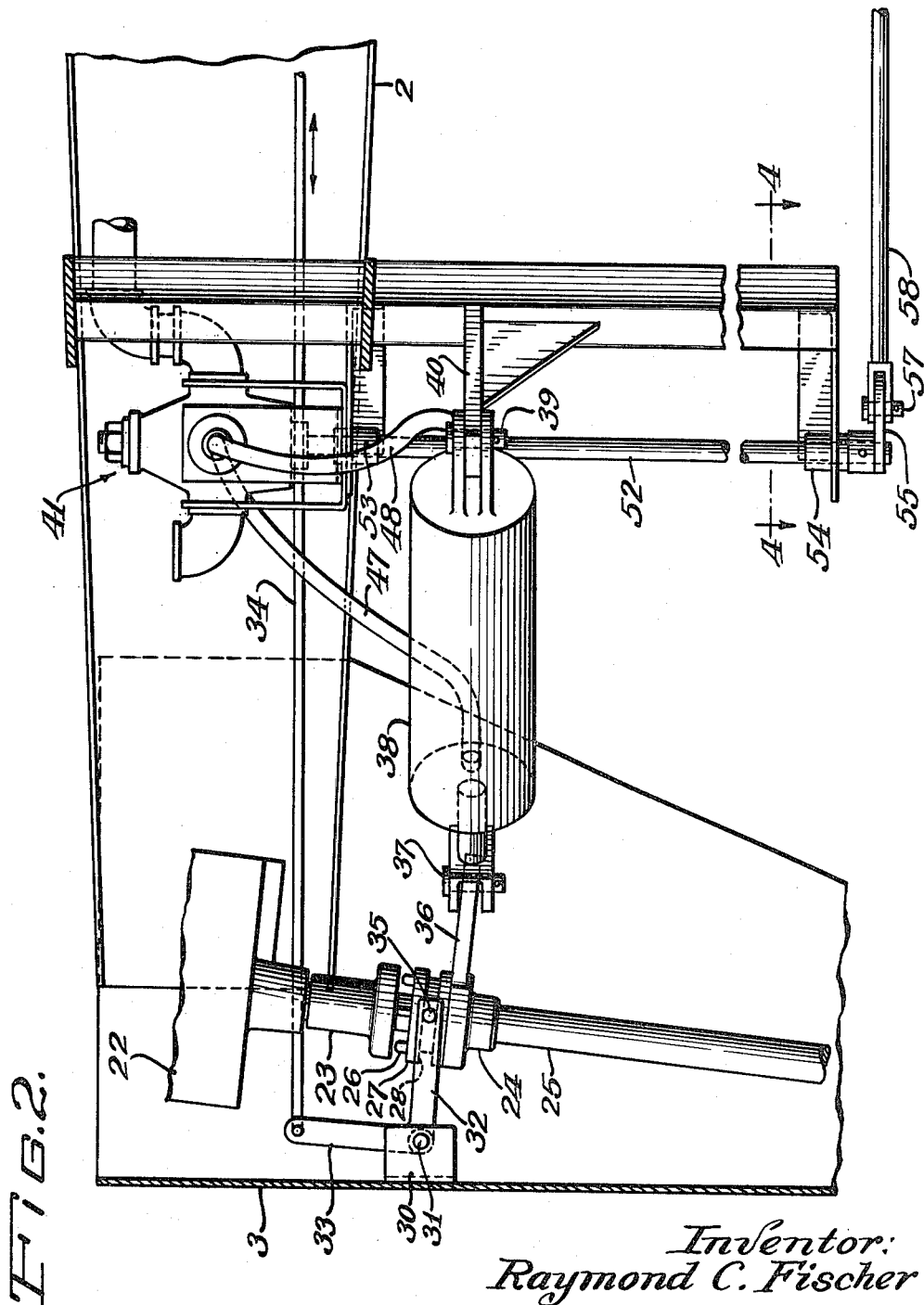
Inventor:
Raymond C. Fischer
Paul O. Pippel Atty.

March 30, 1965  R. C. FISCHER  3,175,769
SELF-PROPELLED IRRIGATION APPARATUS
Filed Sept. 14, 1961  4 Sheets-Sheet 3
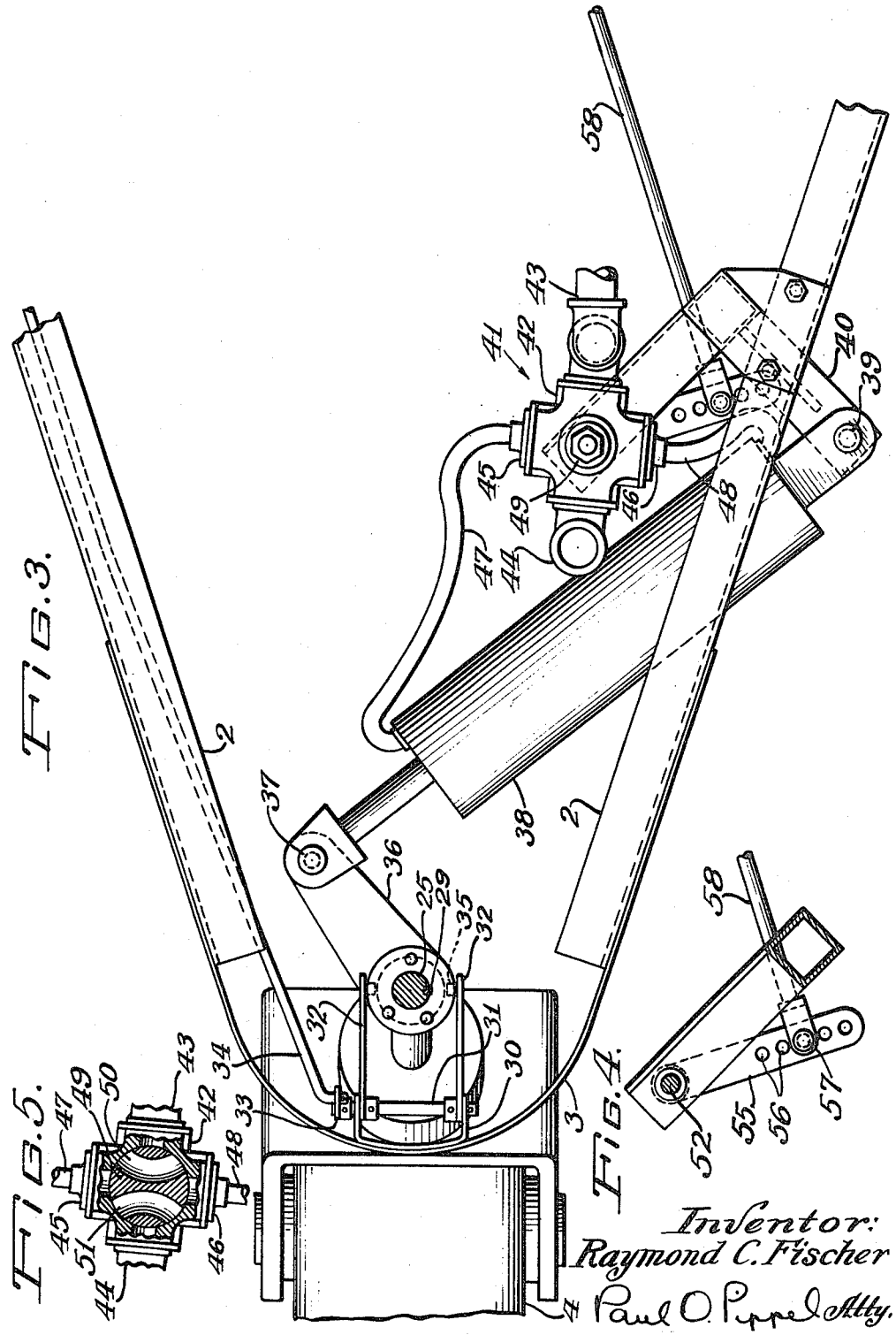
Inventor:
Raymond C. Fischer
Paul O. Pippel Atty.

March 30, 1965  R. C. FISCHER  3,175,769
SELF-PROPELLED IRRIGATION APPARATUS
Filed Sept. 14, 1961  4 Sheets-Sheet 4
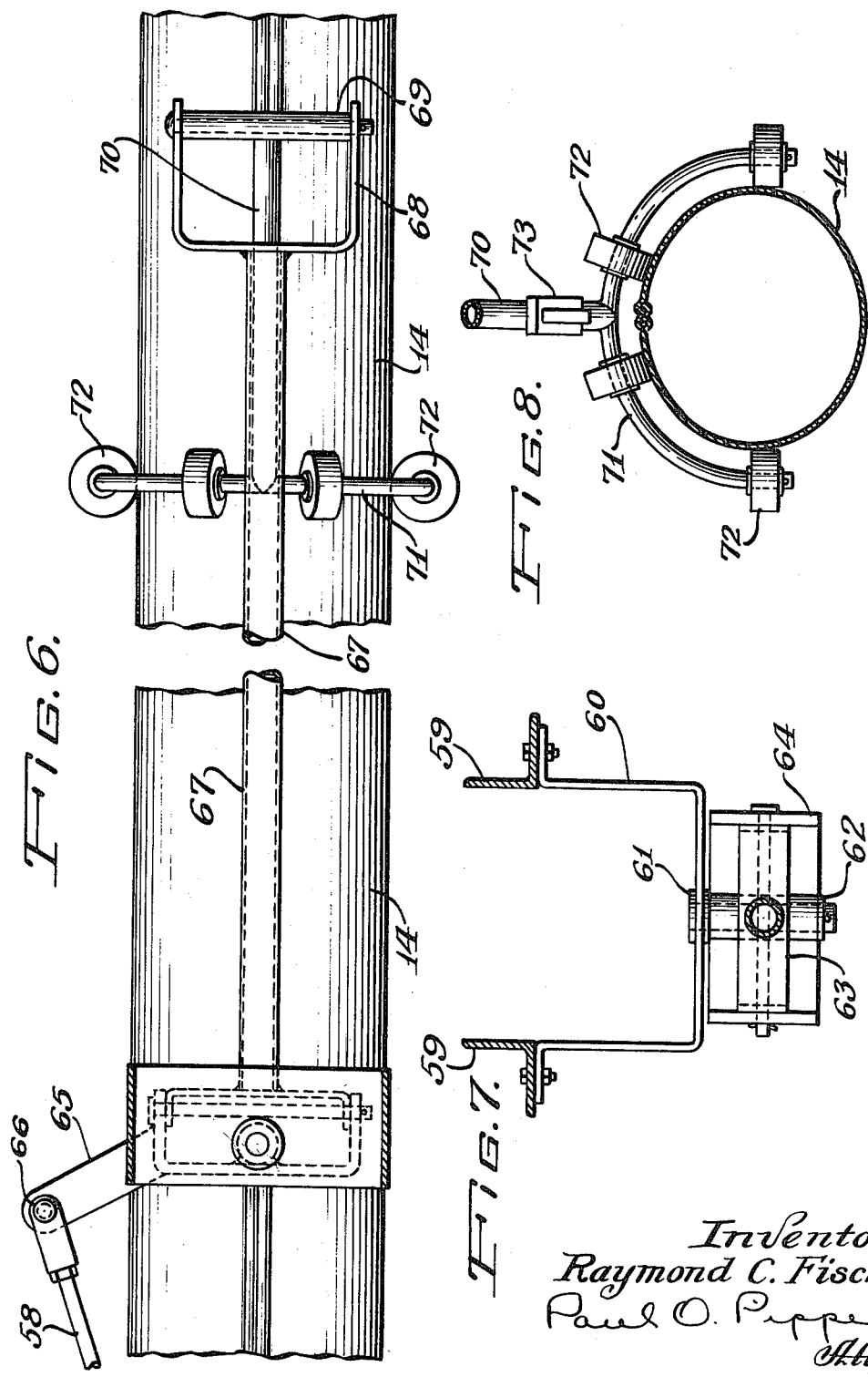
Inventor:
Raymond C. Fischer
Paul O. Pippel
Atty.

United States Patent Office 3,175,769
Patented Mar. 30, 1965

3,175,769
SELF-PROPELLED IRRIGATION APPARATUS
Raymond C. Fischer, Hinsdale, Ill., assignor to International Harvester Company, Chicago, Ill., a corporation of New Jersey
Filed Sept. 14, 1961, Ser. No. 138,151
9 Claims. (Cl. 239—183)

This invention pertains generally to steering and, more particularly, to automatically regulating the direction of movement of a vehicle in response to direction-sensing means.

In an irrigation system utilizing a self-propelled irrigation apparatus having a plastic hose leading to one edge of the field and a source pumping unit at the edge of the field, it is essential that the apparatus move along the path defined by the plastic hose so that uniform distribution of water will be provided for purposes of irrigation. Heretofore, self-propelled vehicle-type irrigation units required manual control by an operator stationed thereon in order to ensure proper travel. Such automatic steering devices as were formerly available have not found practical application on the farm because the travel thereof varied to an unacceptable degree and because mechanical steering linkage was difficult to control, often tending to move the plastic hose rather than the vehicle.

It is accordingly a primary object of this invention to provide means for automatically steering a self-propelled irrigation apparatus to ensure that full irrigation coverage of the field is obtained.

Another object of this invention is to provide a self-propelled irrigation apparatus having means for sensing the path along which water delivery hose is laid and additional means responsive to this sensing means for controlling the steering mechanism of said apparatus to ensure travel thereof along said hose.

Still another object of this invention is to provide automatic steering means for use with a vehicle, which means incorporates sensing feelers in contact with external path defining means, said sensing feelers being displaced in accordance with variance between the path and the direction of travel of said vehicle, and means responsive to said displacement for controlling the direction of travel of said vehicle.

A further object of this invention is to provide automatic steering means for a self-propelled irrigation and apparatus utilizing water-powered hydraulic means for changing the direction of travel of said apparatus which means derives its power from the water distribution system associated with said apparatus.

The foregoing along with additional objects and advantages will be apparent from the following description of a specific embodiment of the invention as depicted in the accompanying drawings, in which:

FIGURE 2 is an enlarged fragmentary elevational view showing the power steering unit and its associated control apparatus;

FIGURE 3 is a top plan view of the showing in FIGURE 2;

FIGURE 4 is an enlarged fragmentary view taken on the line 4—4 of FIGURE 2;

FIGURE 5 is a cross-sectional view showing details of the hydraulic control valve;

FIGURE 6 is an enlarged top plan view taken on the line 6—6 of FIGURE 1;

FIGURE 7 is an enlarged elevational view taken on the line 7—7 of FIGURE 1; and

FIGURE 8 is an enlarged fragmentary elevational view taken on the line 8—8 of FIGURE 1.

Figure 1:
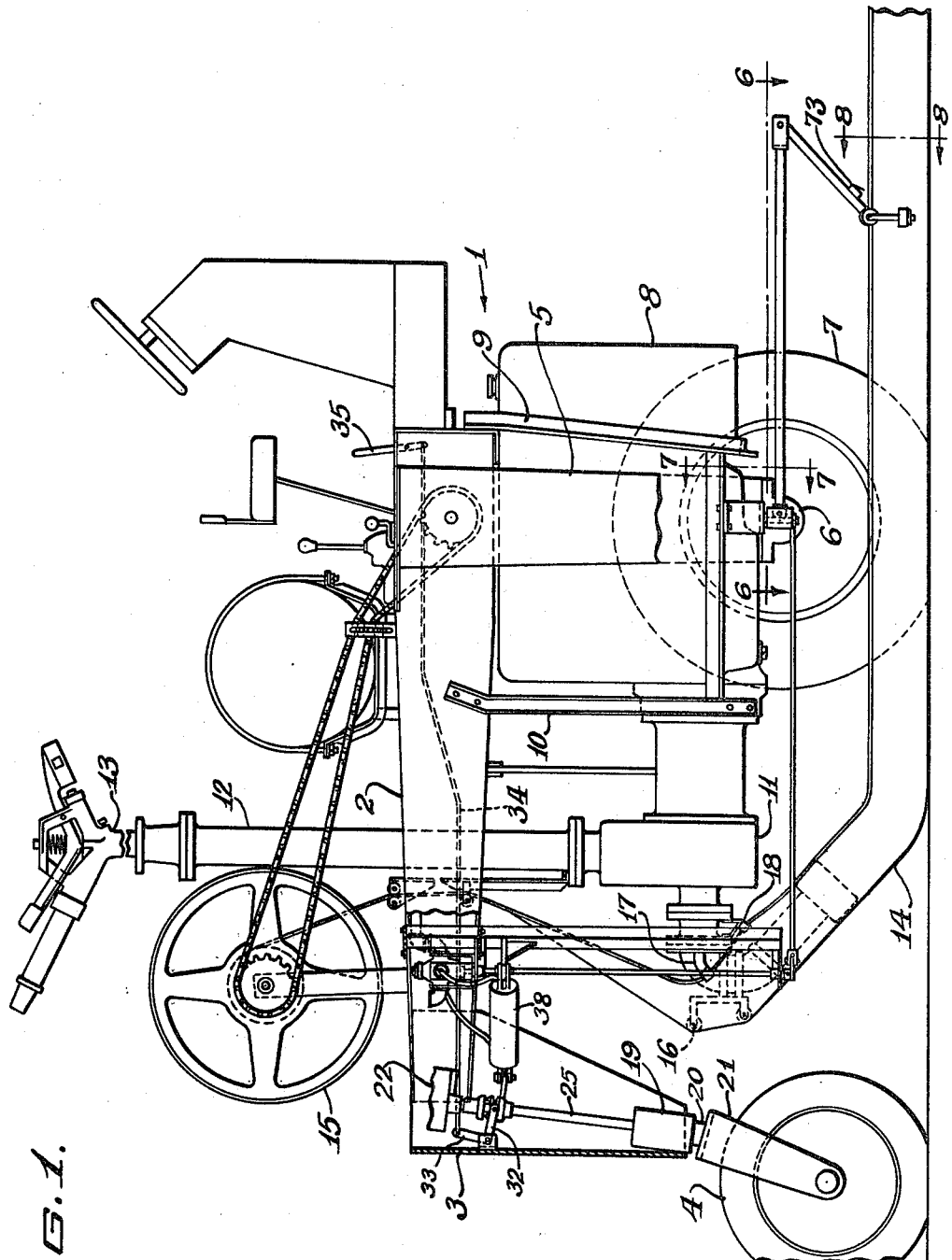
FIGURE 1 is a side-elevational view of a self-propelled irrigation apparatus embodying a preferred form of the present invention.

Referring to FIGURE 1 of the drawings in detail, the reference numeral 1 generally designates a self-propelled irrigation apparatus comprising a frame structure of A-frame form having a pair of side rail channel members 2 being joined at the rear by a downwardly depending member 3 to which a rear-steerable wheel 4 is suitably mounted. A pair of vertical channel members 5 extending downwardly from the side rail members 2 support a transverse axle 6 by means of suitable journals. On axle 6 is mounted a pair of front-drive wheels 7.

A gasoline engine is supported at the front and rear by pairs of hanger members 9 and 10 extending from the frame structure. A pump 11 is driven by the engine, the discharge side of the pump being connected to an upstanding pipe 12 on which is mounted a joint rotatable sprinkler head 13.

The intake side of the pump 11 extends downwardly and forwardly into the plastic conduit 14. This conduit, which is disclosed in U.S. Patent No. 2,974,876, is carried fiat by the reel 15 and is unwound as a unit and formed by the guides 16 and 17 and the zipper 18 in synchronization with the propulsion of the entire apparatus. In addition, the reel 15 may be reciprocated in order to prevent undue building up of marginal portions of the conduit 14 during winding.

The pump intake includes means for sensing the water level or rate of flow from a source pumping unit through the plastic conduit 14 to the pump 11 on the irrigation apparatus. This means controls a linking device for regulating the throttle on the engine 8 so as to control the speed of the irrigation apparatus as well as the pumping rate of pump 11 in order to coordinate same with the source pumping unit at the edge of the field. This means is disclosed in detail in copending application Serial No. 138,152 filed September 14, 1961, to which attention is invited.

Proceeding more specifically with the present invention, the journal 19 is suitably secured to member 3. Rotatably mounted within the journal 19 and downwardly depending therefrom is the shaft 20 carrying the forked support member 21 to which is secured wheel 4. The steering gear box 22 is suitably mounted on frames 2 at the upper end of member 3. As clearly shown in FIGURE 2, downwardly depending from gear box 22, is the driving member 23 forming part of a clutch housing. The driven member 24 is journaled on the shaft 25, which extends downwardly through journal 19. Corresponding groups of locking elements 26 extend from the upper and lower surfaces of the clutch plate 27 for engagement with members 23 and 24 selectively so as to engage either the manual steering mechanism controllable from the operator's position at the forward end of the apparatus or the automatic steering mechanism for control of the steerable wheel 4. Slidable clutch plate 27 has the groove 28 formed intermediate the ends thereof and is keyed as at 29 to prevent rotation relative to its shaft 25.

The mounting plate 30 is suitably secured to member 3 as by welding. Plate 30 contains the pivotal element 31 upon which are secured the lever arms 32 and 33 which, together, form a rigid angular member assembly. The lever arm 32 incorporates a pair of knobs 35 which engage the groove 28 of the clutch plate 27 and reciprocate the clutch plate longitudinally relative to the shaft 25 upon activation of the lever. To lever arm 33 is connected the control rod 34 extending forwardly to the operator's position and suitably controlled by means of pivotal handle 35. Thus it will be seen that operation of control 35 rocks lever arms 32 and 33 about pivot 31. This results in reciprocation of clutch plate 27 on the shaft 25 toward contact with either member 23 or member 24 for engagement of the manual or automatic steering apparatus respectively.

Extending outwardly from member 24 is the plate 36 to which is pivotally connected at 37 one end of the double-acting hydraulic cylinder 38. The other end of double-acting hydraulic cylinder 38 is pivoted at 39 to bracket 40 which, in turn, is suitably secured to the frame of the assembly.

The fourway hydraulic control valve 41 incorporates the housing 42 secured to the assembly frame and having inlet port 43 connected to the discharge of pump 11 by means not shown and outlet port 44 connected by a return line to the open end of plastic conduit 14 and further having intermediate ports 45 and 46 connected through lines 47 and 48 respectively to opposite sides of the double-acting hydraulic cylinder 38. The valve 41 incorporates a rotatable core element 49 having dual passages 50 and 51 therein for engagement with alternate pairs of ports to control the flow of fluid to and from hydraulic cylinder 38 in response to control linkage.

Extending downwardly from the core element 49 of the valve 41 is the signal shaft 52. Signal shaft 52 is suitably journaled in mounting journals 53 and 54 and has the lower end thereof the outstanding arm 55. Arm 55 incorporates a series of mounting holes 56, various ones of which are pinned as at 57 to link 58 in order to provide an adjustable connection between link 58 and arm 55 so that a given movement of link 58 will provide an adjustable series of desired movements of arm 55 and associated signal shaft 52.

Turning now to FIGURES 6 and 7, it will be seen that mounting brackets 59 extend downwardly from the assembly frame and support the universal-type pivot 60 which includes the bushings 61 from which extends the pivotal elements 62 which may be rocked in a horizontal plane. Upon pivotal element 62 is mounted the pivotal element 63 which is rockable in a vertical plane and which, additionally, carries the bracket 64 to which the arm 65 is secured. Link 58 is pinned as at 66 to arm 65. It should be noted at this point that arm 65 and arm 55 extend outwardly in a direction transverse to the longitudinal axis of the irrigation apparatus when the wheel 4 and the universal pivot are in the normal longitudinally facing directions.

Extending forwardly from the vertical pivotal element 63 is the rod 67. At the forward end of rod 67 is attached the bifurcated support 68 which serves as a mounting for the pivot 69. Extending downwardly and rearwardly from pivot 69 is the sensing rod 70 to which is attached the curvilinear support member 71. Spaced along support member 71 are rotatable contact feeler rollers 72 suitably rotatably mounted thereon. Member 71 takes the form of conduit 14 so that feeler elements 72 contact the surface of conduit 14 around the circumference thereof.

Microswitch 73 is mounted upon the rod 70 and is connected through a suitable circuit, not shown, to the ignition system of the engine 8 and source engine at the end of the field in order to shut off the engines or, alternatively, the pumps contact with a suitable element mounted at the end of conduit 14 and extending upwardly therefrom.

In operation, the operator drives the irrigation apparatus to a starting position adjacent the opposite end of the field from a water source, forming and laying the plastic conduit 14 behind him as he does so. He then shifts his controls for sprinkler propulsion and by means of control 35 engages either the manual steering assembly or the automatic steering assembly by moving the clutch plate 27 to its upper or lower position, respectively, engaging either member 23 or member 24. Assuming automatic steering in which case clutch plate 37 is in its lower position in engagement with member 24, the operator then steps off of the unit allowing it to move under its own power along the conduit 14, being guided by the automatic steering assembly. Feeler elements 72 respond to a curve in the path of conduit 14 by sliding transversely to the axis of conduit 14, causing rods 70 and 67 to oscillate transversely to the longitudinal axis of the apparatus 1. Pivot 69 and vertical pivotal element 63 allow for play in rods 70 and 67 in the vertical plane without effecting the steering of the apparatus 1. However, it should be noted that horizontal pivot 62 responds to oscillation of these rods in a transverse direction causing rotation of outwardly extending arm 65 and, through link 58, a corresponding rotation of the outwardly extending arm 55. Such rotation is transmitted through signal shaft 52 to the core element 49 of the four-way hydraulic control valve 41. Depending upon the transverse movement of feeler elements 72, the core 49 will be rotated in either a clockwise or a counterclockwise direction to communicate passages 50 and 51 with the suitable ports which, in turn, direct fluid from the water distribution means through inlet 43, out of one of the intermediate ports, to one side of the double-acting hydraulic cylinder 38; returning water from the other side of said cylinder through the other intermediate port and out of discharge port 44. This causes extension or retraction of the hydraulic cylinder 38 for the purpose of rotating shaft 25 and corresponding steerable wheel 4 in a direction indicated by movement of feeler 72 for the purpose of compensating for variance in the direction of travel of the apparatus and the path of travel as previously established by the position of conduit 14.

Although the present invention has been embodied in the self-propelled irrigation apparatus the same may also be incorporated in other vehicles where an automatic corrective factor is to be provided in a steering apparatus to compensate for variations in travel with respect to the previously outlined path of travel.

It is to be understand that the foregoing description and the accompanying drawings have been given only by way of illustration and example. It is further to be understood that changes in the elements, rearrangements of parts, and the substitution of equivalent elements, all of which will be obvious to those skilled in the art are considered to be within the scope of the present invention which is limited only by the claims which follow.

I claim:

1. In combination with a vehicle having steerable wheel means associated therewith; mechanical means supported by said vehicle for sensing variance between the direction of travel of said vehicle and a predetermined path of travel established therefor; hydraulic means supported by said vehicle and operatively connected with said wheel means for steering said wheel means so as to compensate for said variance; flow control means supported by said vehicle and operatively connected with said hydraulic means for selectively regulating the flow of fluid to and from said hydraulic means; and linkage means interconnected with said mechanical means and said flow control means for operating said flow control means in response to said sensing.

2. In a self-propelled irrigating apparatus having steerable wheel means and fluid distribution means associated therewith; the improvement comprising mechanical means for sensing variance between the direction of travel of said apparatus and a predetermined path of travel established therefor; hydraulic means engageable with said wheel means for steering said wheel means so as to compensate for said variance; valve means operatively associated with said fluid distribution means and said hydraulic means for partially diverting fluid from said fluid distribution means to said hydraulic means so as to power said hydraulic means; and linkage means operatively connected with said mechanical means and said valve means for operating said valve means in response to said sensing.

3. In a self-propelled irrigating apparatus having steerable wheel means and fluid distribution means associated therewith; the improvement comprising means for manually steering said wheel means; means for automatically steering said wheel means in order to compensate for variance between the direction of travel of said apparatus and a predetermined path of travel established therefor, and clutch means interengageable with said steering means and said wheel means for selectively engaging said wheel means with one of said steering means; said automatic steering means including means for sensing said variance, hydraulic means for applying force to said wheel means, valve means operatively connected with said fluid distribution means and said hydraulic means for partially diverting fluid from said fluid distribution means to said hydraulic means so as to power said hydraulic means, and linkage means interconnecting said sensing means and said valve means for operating said valve means in response to said sensing.

4. In a self-propelled irrigating apparatus having steerable wheel means and fluid distribution means and including fluid supply conduit means associated therewith adapted to be laid on the ground in a predetermined pattern in order to establish a path of travel for said apparatus; the improvement comprising means supported by said apparatus for sensing variance between the direction of travel of said apparatus and said path including contact means engageable with said conduit means and movable relative thereto in the event of said variance; hydraulic means operatively connected with said wheel means for steering said wheel means so as to compensate for said variance; valve means operatively connected with said fluid distribution means and said hydraulic means for at least partially diverting fluid from said fluid distribution means to said hydraulic means so as to power said hydraulic means; and linkage means interconnecting said contact means and said valve means for operating said valve means in response to said relative movement of said contact means; said linkage means including means for discontinuing said diversion of fluid upon the accomplishment of a predetermined amount of compensation for said variance.

5. In a self-propelled irrigating apparatus including steerable wheel means and fluid distribution means and having fluid supply conduit means associated therewith adapted to be laid on the ground in a predetermined pattern in order to establish a path of travel for said apparatus; the improvement comprising means supported by said apparatus for sensing variance between the direction of travel of said apparatus and said path including contact means engageable with said conduit means and movable relative thereto in the event of said variance; hydraulic means including a double-acting hydraulic cylinder operatively connected to said wheel means for steering said wheel means so as to compensate for said variance; rotary valve means including an interior valve housing element having a pair of passages therethrough, an exterior valve housing element mounted about said interior valve housing element and having an inlet port and an outlet port each communicating with the high and low pressure sides of said fluid distribution means, respectively, and a pair of intermedate ports each communicating with opposite sides of said double-acting hydraulic cylinder, respectively, whereby in a first position of said valve means said passages communicate said inlet port with one side of said hydraulic cylinder and said outlet port with the opposite side of said hydraulic cylinder while in a second position of said valve means said passages communicate said inlet port with said opposite side of said hydraulic cylinder and said outlet port with said one side of said hydraulic cylinder; and mechanical linkage means interconnecting said contact means and said valve means for rotating one of said housing elements in response to relative movement of said contact means.

6. The invention according to 5; said linkage means comprising horizontal pivot means mounted on said apparatus and vertical pivot means mounted on said horizontal pivot means, rod means interconnecting said contact means and said vertical pivot means, and articulated link means interconnecting said horizontal pivot means and said exterior valve housing.

7. The invention according to claim 6; said contact means comprising supporting shaft means and a plurality of freely rotatable contact rollers spaced along said shaft means for engaging said conduit means on the surface thereof.

8. The invention according to claim 7; said contact means having micro-switch means electrically connected to said fluid distribution means and being engageable by said conduit means for deactivating said fluid distribution means when contact between said rollers and said conduit means is broken.

9. The invention according to claim 6; said linkage means further having means for limiting the vertical pivotal movement of said rod means.

References Cited by the Examiner
UNITED STATES PATENTS

| 2,474,071 | 6/49 | Stetson | 239—183 |
| 2,674,332 | 4/54 | Oushinsky | 180—79.1 |
| 2,974,876 | 3/61 | Poyner et al. | 239—183 |
| 2,981,355 | 4/61 | Rabuse | 180—79.1 |

LOUIS J. DEMBO, Primary Examiner.

ROBERT A. O'LEARY, RAPHAEL M. LUPO,
Examiners.